(12) United States Patent
Sung et al.

(10) Patent No.: US 9,549,103 B2
(45) Date of Patent: Jan. 17, 2017

(54) ANTENNA FOR CAMERA

(71) Applicant: Samsung Electronics Co., Ltd., Gyeonggi-do (KR)

(72) Inventors: Sangbong Sung, Gyeonggi-do (KR); Seunghwan Kim, Seoul (KR); Joonho Byun, Gyeonggi-do (KR); Jaebong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 93 days.

(21) Appl. No.: 14/192,270

(22) Filed: Feb. 27, 2014

(65) Prior Publication Data

US 2014/0240581 A1 Aug. 28, 2014

(30) Foreign Application Priority Data

Feb. 27, 2013 (KR) .................. 10-2013-0020827

(51) Int. Cl.
| | |
|---|---|
| H01Q 1/24 | (2006.01) |
| H04N 5/225 | (2006.01) |
| H01Q 9/14 | (2006.01) |
| H01Q 9/42 | (2006.01) |
| H01Q 13/10 | (2006.01) |
| H01Q 21/28 | (2006.01) |
| H01Q 5/378 | (2015.01) |
| H01Q 5/40 | (2015.01) |

(52) U.S. Cl.
CPC ............ *H04N 5/2251* (2013.01); *H01Q 1/242* (2013.01); *H01Q 5/378* (2015.01); *H01Q 5/40* (2015.01); *H01Q 9/145* (2013.01); *H01Q 9/42* (2013.01); *H01Q 13/10* (2013.01); *H01Q 21/28* (2013.01); *G03B 2217/002* (2013.01)

(58) Field of Classification Search
CPC .......... H01Q 1/242; H01Q 9/30; H01Q 1/243; H01Q 1/36; H01Q 1/362; H01Q 5/371; H01Q 1/241
USPC .............................. 343/702, 895; 348/211.2
See application file for complete search history.

(56) References Cited

U.S. PATENT DOCUMENTS

| | | | | |
|---|---|---|---|---|
| 7,068,227 B2* | 6/2006 | Ying | ...................... | H01Q 1/242 343/702 |
| 7,653,296 B2* | 1/2010 | Wakamizu | ............. | G03B 17/04 396/56 |

(Continued)

FOREIGN PATENT DOCUMENTS

| | | |
|---|---|---|
| CN | 202615109 | 12/2012 |
| EP | 1 122 811 | 8/2001 |

(Continued)

OTHER PUBLICATIONS

Database WPI Week 201328 Thomson Scientific, XP002725314, Dec. 19, 2012.

(Continued)

*Primary Examiner* — Linh Nguyen

(74) *Attorney, Agent, or Firm* — The Farrell Law Firm, P.C.

(57) ABSTRACT

An antenna for a camera, comprising a camera having a communication module provided therein, a first radiator provided in a predetermined position of a lens barrel of the camera and having a length and a width for receiving a signal from a first wireless communication system, a power feeding line configured to feed a power from the communication module of the camera to the first radiator, and a ground line configured to ground the first radiator.

19 Claims, 17 Drawing Sheets

(56) References Cited

U.S. PATENT DOCUMENTS

| | | | |
|---|---|---|---|
| 8,126,324 B2 | 2/2012 | Young et al. | |
| 8,384,614 B2* | 2/2013 | Kennedy | H01Q 1/08 343/909 |
| 8,436,775 B2* | 5/2013 | Brey | H01Q 1/12 343/702 |
| 2003/0142032 A1* | 7/2003 | Lichtfuss | H01Q 1/38 343/873 |
| 2004/0041734 A1 | 3/2004 | Shiotsu et al. | |
| 2006/0093340 A1* | 5/2006 | Yamaki | G03B 17/00 396/56 |
| 2007/0098384 A1* | 5/2007 | Wakamizu | G03B 17/04 396/56 |
| 2009/0051604 A1 | 2/2009 | Zhang et al. | |
| 2011/0241948 A1 | 10/2011 | Bevelacqua et al. | |
| 2012/0081254 A1* | 4/2012 | Moon | 343/720 |
| 2012/0268328 A1 | 10/2012 | Kim et al. | |
| 2012/0293668 A1* | 11/2012 | Huang | H04N 5/2257 348/207.1 |
| 2013/0135512 A1* | 5/2013 | Kim | H04N 5/2251 348/335 |
| 2014/0022130 A1* | 1/2014 | Man et al. | 343/725 |
| 2014/0340576 A1* | 11/2014 | Kim | H01Q 1/00 348/375 |

FOREIGN PATENT DOCUMENTS

| | | |
|---|---|---|
| EP | 1 359 675 | 11/2003 |
| EP | 1 538 703 | 6/2005 |
| EP | 1 936 736 | 6/2008 |
| EP | 2 495 806 | 9/2012 |
| JP | 2005-345802 | 12/2005 |
| JP | 2006-270308 | 10/2006 |
| JP | 2007094392 | 4/2007 |
| JP | 2007096421 | 4/2007 |
| JP | 4897231 | 3/2012 |
| KR | 10-0694876 | 3/2007 |
| KR | 10-1049572 | 7/2011 |

OTHER PUBLICATIONS

European Search Report dated Oct. 31, 2014 issued in counterpart application No. 14156785.9-1812.

* cited by examiner

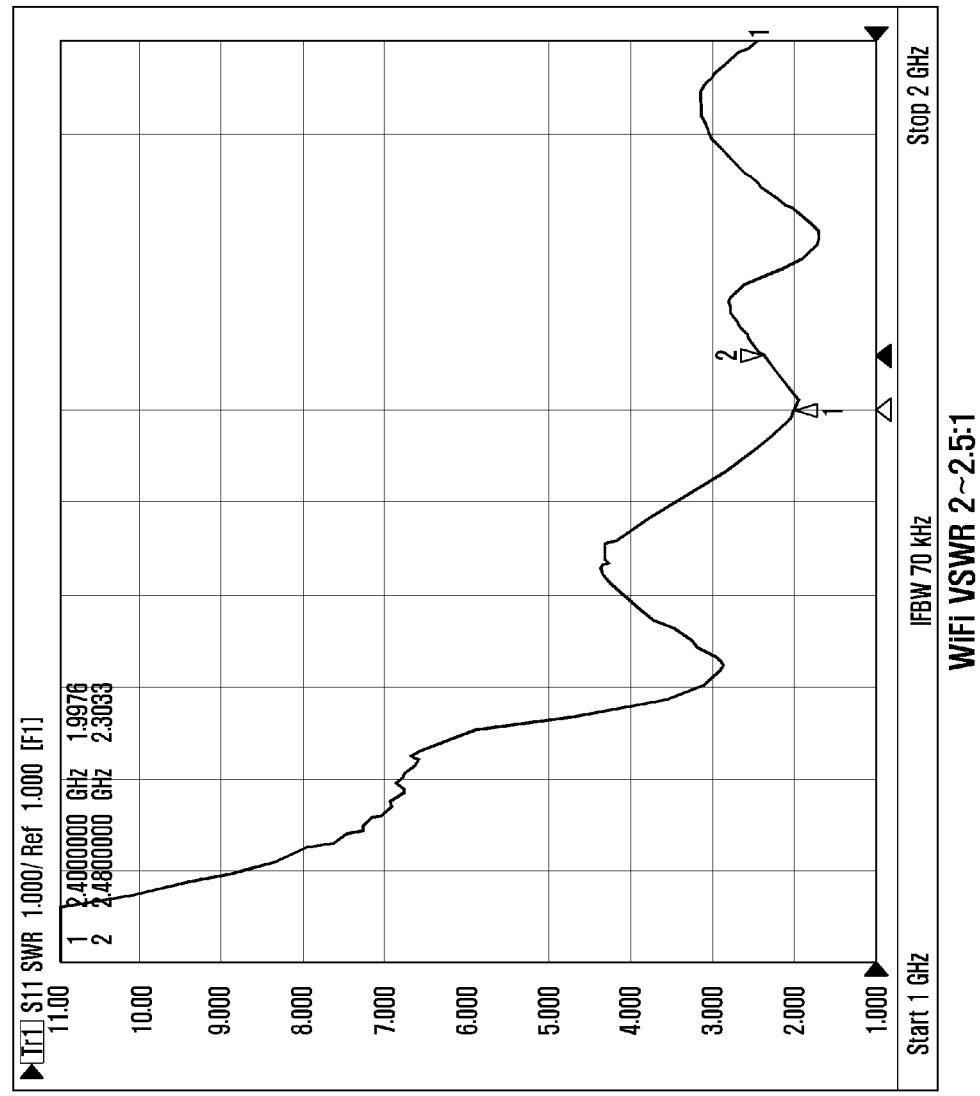

ANTENNA FOR CAMERA

PRIORITY

This application claims priority under 35 U.S.C. §119(a) to a Korean patent application filed on Feb. 27, 2013 in the Korean Intellectual Property Office and assigned Serial No. 10-2013-0020827, the entire disclosure of which is incorporated herein by reference.

BACKGROUND OF THE INVENTION

1. Field of the Invention

The present disclosure generally relates to an antenna for a camera, and more particularly, to an antenna for a camera that is accommodated in a lens barrel, which is detachably attached to the camera to zoom out, to adjust resonance frequencies.

2. Description of the Related Art

In general, a digital camera is a device that converts light reflected from an object into an electrical signal, stores the converted electric signal as image data, and processes or reproduces the stored image data.

Since the digital camera does not use a film, development, photo printing, and/or enlargement processes are not required, and both a still image and a moving image can be captured and stored.

Further, the ways in which the digital camera may be utilized have gradually increased. For example, captured image data may be stored in a storage device of a computer, such as a computer memory, a CD-ROM, or a USB memory, or may be transmitted to a desired person through an e-mail. That is, since the digital camera can easily edit and process the captured image data using digital media, it has quickly replaced the need for a film camera.

Because aesthetic factors of the digital camera have recently influenced product sales greatly, the design of the product has been recognized as an important factor in addition to the performance of the product.

Further, although a number of components of the digital camera have increased with the gradual convergence of many functions to the digital camera, users usually prefer a simple design.

Digital cameras, on which various functions are mounted in compliance with various desires of consumers, have recently been developed, and among them, is a digital camera having a built-in antenna module.

A built in antenna module enables the camera to directly perform multimedia data communication.

For example, data of an image or a moving image captured through the camera can be transmitted to another electronic device through a Wi-Fi antenna, or position information can be provided using satellite information that is received from a satellite through a GPS module.

The shape of such a built-in antenna has been changed in accordance with the trend of a miniaturized and slim communication terminal. That is, as the type of antenna varies, a region where other components are arranged is further required, and as the size of the camera becomes smaller, it is necessary to further reduce the size or thickness of the antenna and to arrange the antenna on a main board of the camera.

However, since the length of the antenna is typically proportional to the frequency wavelength, reduction of the size of an antenna for receiving a high frequency band, for example, a GPS antenna, is restricted to a specific length.

Further, in the case of dispersing and arranging a plurality of antennas on several regions in the camera, it is required that a main Printed Circuit Board (PCB), an electronic object such as a battery, and metal components are arranged to be spaced apart from each other.

According to the characteristics of the antenna, an upper end portion of the camera is optimal for improving the performance of the antenna. However, it is difficult to ensure a space due to the influence of a power, a shutter, and a zoom. The left or right side of the camera may affect the performance due to a hand effect, and the lower end portion of the camera may be affected by use of a tripod or a battery.

FIG. 1A is a view illustrating an antenna provided at a lower end of a camera according to the related art, and FIG. 1B is a graph illustrating simulation results of the Voltage Standing Wave Ratio (VSWR) characteristics of the antenna illustrated in FIG. 1A.

Referring to FIGS. 1A and 1B, if the antenna is arranged at the lower end of the camera, as can be seen from the graph of FIG. 1B, the frequency bandwidth becomes narrow, and radiation gain efficiency is not high. FIG. 1A illustrates the shape of an antenna as seen from a lower end of a camera. The reference numeral 11 denotes a body of a camera, 12 denotes a lens of a camera, and 13 denotes an antenna positioned at a lower end of the body of the camera.

Further, due to the dispersed arrangement of the plurality of antennas, the efficiency of the internal layout of the camera is deteriorated, and this results in the miniaturization and slimming of the camera to be disturbed.

Accordingly, there is a need for development of a camera that maximizes the performance of the antenna and improves the simplicity and aesthetic design of the external appearance of the camera even in a state in which antennas of various frequency bands are mounted on the camera.

SUMMARY OF THE INVENTION

The present disclosure has been made to address at least the above problems and disadvantages, and to provide at least the advantages described below.

Accordingly, embodiments of the present invention provide an antenna for a camera that enables easy adjustment of a resonance frequency of the antenna accommodated in the camera.

Embodiments of the present invention also provide an antenna for a camera that increases a radiation gain through an efficient arrangement of the antenna in the camera to prevent performance deterioration due to limitations caused by the surroundings of the camera or the influence of a hand effect.

Embodiments of the present invention also provide an antenna for a camera that prevents a deterioration of the radiation gain efficiency of the antenna due to the interference with a body or a lens of the camera that is made of metal.

Embodiments of the present invention also provide a miniaturized, simple, and slim camera.

In accordance with an aspect of the present invention, an antenna for a camera, comprising a camera having a communication module provided therein, a first radiator provided in a predetermined position of a lens barrel of the camera and having a length and a width for receiving a signal from a first wireless communication system, a power feeding line configured to feed a power from the communication module of the camera to the first radiator, and a ground line configured to ground the first radiator.

BRIEF DESCRIPTION OF THE DRAWINGS

The above and other aspects, features, and advantages of the present invention will be more apparent from the following detailed description taken in conjunction with the accompanying drawings, in which:

FIG. 4 is a graph illustrating simulation results of the VSWR characteristics of a first radiator according to an embodiment of the present invention;

DETAILED DESCRIPTION OF EMBODIMENTS OF THE PRESENT INVENTION

Figure 1A:
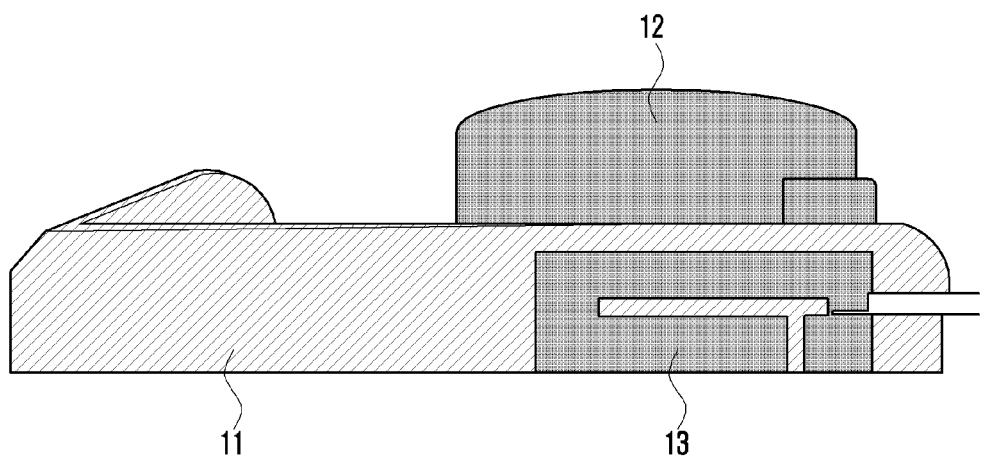
FIG. 1A is a view illustrating an antenna provided at a lower end of a camera according to the related art.
Figure 1B:
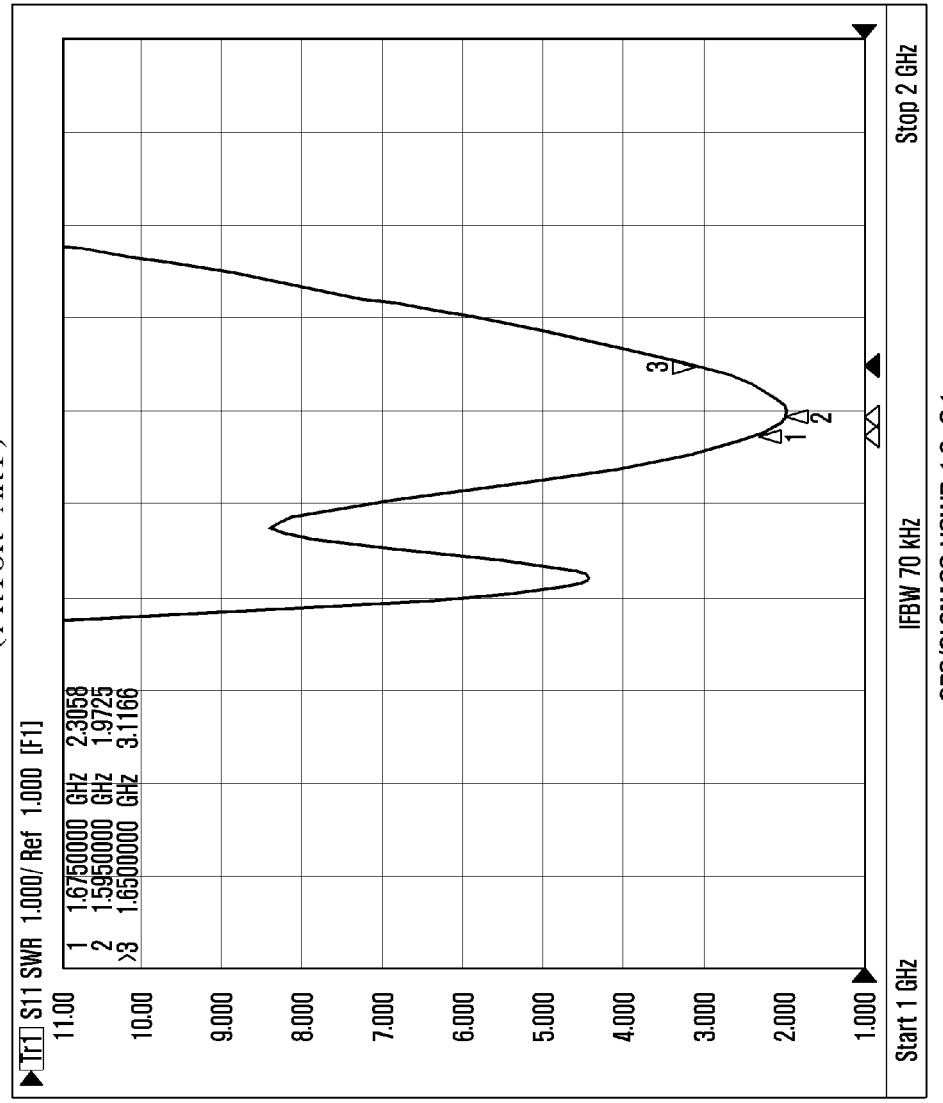
FIG. 1B is a graph illustrating simulation results of the VSWR characteristics of the antenna illustrated in FIG. 1A according to the related art.

Hereinafter, embodiments of the present invention will be described in detail with reference to the accompanying drawings to the extent that those of ordinary skill in the art to which the present disclosure pertains can easily understand the description.

In the following description of the present invention, a detailed description of the technical contents that are well known in the technical field, to which the present disclosure pertains, and are not directly related to the present invention will be omitted. By omitting such an unnecessary description, the subject matter of the present invention will become quite clear.

For the same reason, in the drawings, some constituent elements are exaggerated, omitted, or schematically illustrated. Further, the sizes of the respective constituent elements may not entirely reflect the actual sizes. In the entire description of the present invention, the same drawing reference numerals are used to refer to the same constituent elements across various figures.

Figure 2:
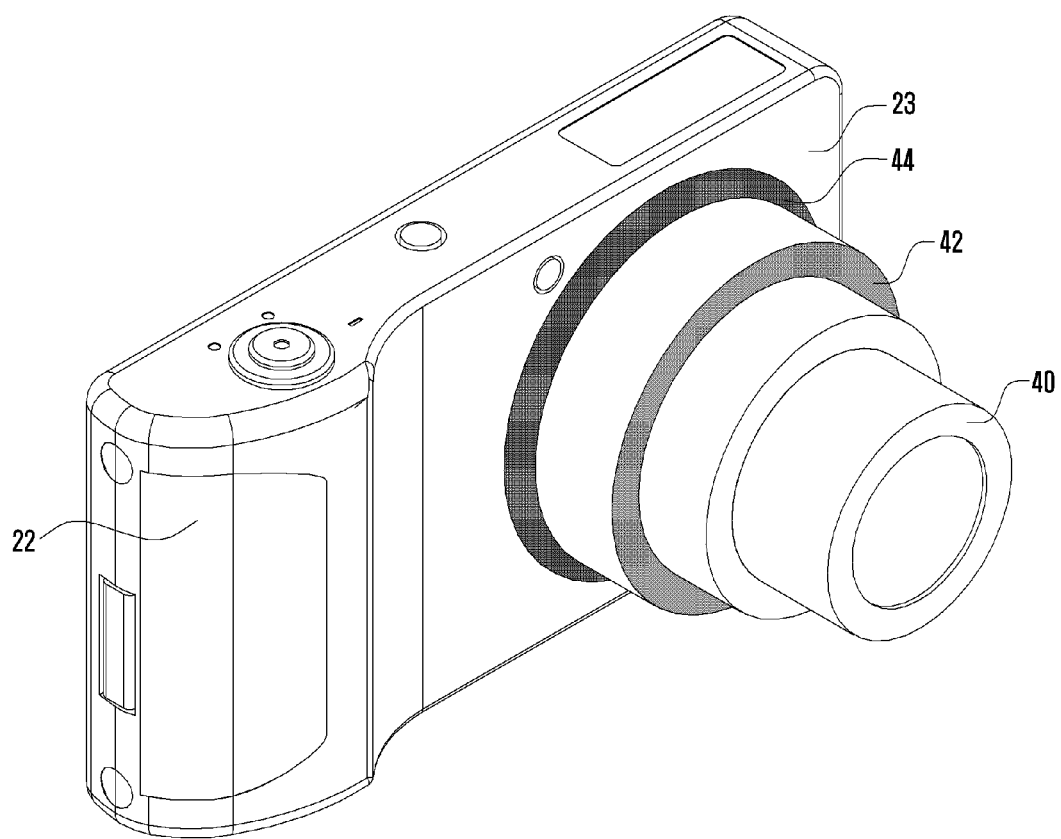
FIG. 2 is a view illustrating the structure of a camera including an antenna according to an embodiment of the present invention.

FIG. 2 is a view illustrating the structure of a camera including an antenna according to an embodiment of the present invention.

Referring to FIG. 2, a camera including an antenna according to an embodiment of the present invention may include an injection-molded grip portion 22, a body portion 23, and a lens portion 40. The injection-molded grip portion 22 may surround one side surface of the camera and may be fastened to the body portion 23. The injection-molded grip portion 22 corresponds to a portion of the camera that is gripped by a user. The injection-molded grip portion 22 may be formed by, for example, injection molding.

The body portion 23 is a cover of the camera that surrounds the entire surface of the camera other than one side surface and a rear surface of the camera, and may be made of a metal material. The body portion 23 corresponds to a portion that includes a shutter button, a flash module, a speaker module, an Auto Focus (AF) module, a tripod module, a battery, an SD memory card, a SIM card, and a plug into which an external jack is inserted. In addition, a main board may also be provided in the body portion 23.

The body portion 23 may be formed by injection molding, or may be formed by metal that surrounds the entire outer surface of the injection-molded body portion according to recent design trends.

The lens portion 40 transmits an image of an object, and includes a lens barrel including at least one lens (hereinafter, the lens portion 40 may be expressed as the lens barrel). A typical lens portion 40 includes one or more lenses and has an object focusing function and/or optical zoom function.

The lens barrel 40 is accommodated in a lens insertion portion formed on a part of the body portion 23. For example, the lens barrel 40 may be fixed to the lens insertion portion or may be detachably inserted into the lens insertion portion.

In particular, the lens barrel 40 is configured to accommodate radiators 34 and 42 that is used as an antenna. In this case, one or two or more radiators may be provided.

Hereinafter, the radiators 34 and 42 provided on the lens barrel 40 will be described in detail with reference to the drawings. FIGS. 3A to 3D are views illustrating the structure of an antenna for a camera according to an embodiment of the present invention.

Figure 3A:
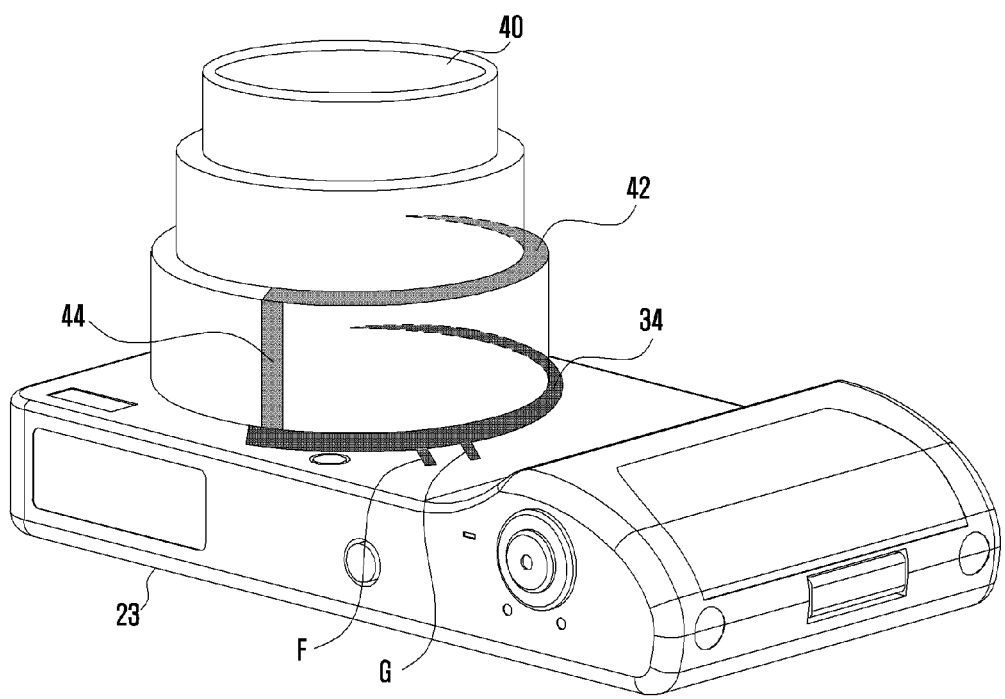
FIGS. 3A to 3D are views schematically illustrating the structure of an antenna for a camera according to an embodiment of the present invention.

Referring to FIG. 3A, the antenna may include a first radiator 34 disposed along the circumference of the lens insertion portion and a second radiator 42 disposed in the lens barrel 40.

The first radiator 34 and the second radiator 42 are antennas for a camera, according to an embodiment of the present invention, to receive radio waves, and are installed on at least one of the lens insertion portion and the lens barrel.

If a radio wave that has the same resonance frequency band as the resonance frequency band of the antenna is emitted from a base station, the antenna recognizes the radio wave and resonates to receive the radio wave. Data included in the received radio wave is transmitted to a main board (not illustrated) inside the camera.

Specifically, the first radiator 34 may be accommodated in a part or the entirety of the circumference of the lens insertion portion, or a plurality of radiators may be disposed in the circumference of the lens insertion portion to be spaced apart at a predetermined distance from each other. The lens insertion portion may be a region that is trenched with a predetermined depth and a size in which a part of the body portion 23 of the camera is inserted into the lens barrel 40.

The first radiator 34 may be provided on the body portion 23 of the camera that is adjacent to the lens insertion portion, or may be provided inside the lens insertion portion.

The first radiator 34 is a radiator having high frequency band characteristics, and has a width that is wider than the width of the second radiator 42 and a length that is shorter than the length of the second radiator 42 to implement a wide band.

The first radiator 34 may be connected to a power feeding portion F that supplies an electric signal and a ground portion G that grounds the first radiator 34.

The power feeding portion F is connected to the main board inside the camera, and feeds a power to the first radiator 34. The ground portion G is connected to the metal that surrounds the body portion 23 of the camera, and grounds the first radiator 34. In particular, since the antenna is grounded using the metal that surrounds the camera body, the broadband characteristics can be implemented.

The second radiator 42 may be disposed in a part or the entirety of the circumference of the lens barrel 40, or a plurality of radiators may be spaced apart at a predetermined distance from each other. The predetermined distance may be defined as a distance in which the plurality of radiators are not influenced by the radio waves and the radiation gain of the antenna is maintained.

In the case in which the lens barrel 40, which projects from the body portion 23 of the camera as illustrated in FIG. 3A, has a multi-stage structure in which the cross-sectional area thereof is gradually narrowed, the second radiator 42 may be provided at each stage of the lens barrel 40.

When the lens barrel 40 is drawn out in multi-stage, the second radiator 42 may be implemented as a plurality of radiators mounted at the respective stages of the lens barrel 40 successively come in contact with each other.

FIG. 3A illustrates an example of the structure in which the first radiator 34 and the second radiator 42 are electrically connected by a connector 44.

FIG. 3A illustrates an embodiment in which the second radiator 42 is provided on a part of the cross section of the lens barrel 40 that is most adjacent to the body portion 23 of the camera. However, the structure and the shape of the second radiator 42 that is accommodated in the lens barrel 40 is not limited to the structures described above, and it will be understood that any shape of the second radiator 42 may be used as long as it can receive the frequency that is required by the camera.

When the second radiator 42 is connected to the first radiator 34, the power is fed from the power feeding portion F that is connected to the first radiator 34, and the second radiator 42 is grounded by the ground portion G. That is, the second radiator 42 is connected to the first radiator 34 to implement one antenna.

The second radiator 42 may be disposed in the lens barrel 40 that is drawn out in multi-stage from the lens insertion portion by the zoom-in function in the direction in which the lens barrel 40 is drawn out.

That is, the second radiator may be disposed in the lens barrel 40 may be drawn out in multi-stage from the lens insertion portion to the outside direction, and when the lens barrel 40 is drawn out in multi-stage, the radiators mounted at the respective stages of the lens barrel 40 successively come in contact with each other.

Further, as the radiators provided at the respective stages are connected to each other when the lens barrel 40 is drawn out, the resonance frequency of the second radiator 42 is determined by the length of the entirety of the connected radiators.

The second radiator 42 includes the connector 44 at one end thereof to be selectively connected to the first radiator 34. The connector 44 may have a structure in which the first radiator 34 and the second radiator 42 are in and out of contact with each other as the lens barrel 40 is rotated in a predetermined direction. Further, as illustrated in FIG. 3A, the connector 44 included in the second radiator 42 may be a conductive line for connection between the second radiator 42 and the first radiator 34, or a portion simply to be connected to the first radiator 34. If the connector 44 is a portion simply to be connected to the first radiator 34, the conductive line for connection between the first radiator 34 and the second radiator 42 as illustrated in FIG. 3A may be an extended portion of the second radiator 42.

According to such a configuration, the lens barrel 40 having a zoom-out function is in a default state, that is, in a state where the lens barrel 40 is inserted, and in an initial state where the first radiator 34 is not connected to the second radiator 42, only the first radiator 34 operates as the antenna implementing a first resonance frequency, and in a state where the lens barrel 40 projects and the first radiator 34 and the second radiator 42 are connected to each other, the radiators operate as the antenna implementing a second resonance frequency.

In other words, if the lens barrel 40 is in the default state in which the first radiator 34 is spaced apart for a predetermined distance from the second radiator 42, the first radiator 34 and the second radiator 42 may operate as different high-frequency band antennas. If the lens barrel 40 is in the projecting state in which the first radiator 34 comes in contact with the second radiator 42, the two radiators are connected to each other to operate as a low-frequency band radiator.

Further, when the lens barrel 40 is in the projected state, the first radiator 34, which is spaced apart from the second radiator 42 by the predetermined distance, may operate as a coupling antenna by the coupling that occurs between the first radiator 34 and the second radiator 42.

Accordingly, in the default state, the first radiator 34 may operate as a Wi-Fi antenna, and in the projected state, the first radiator 34 and the second radiator 42 may operate as a GPS antenna.

Figure 3B:
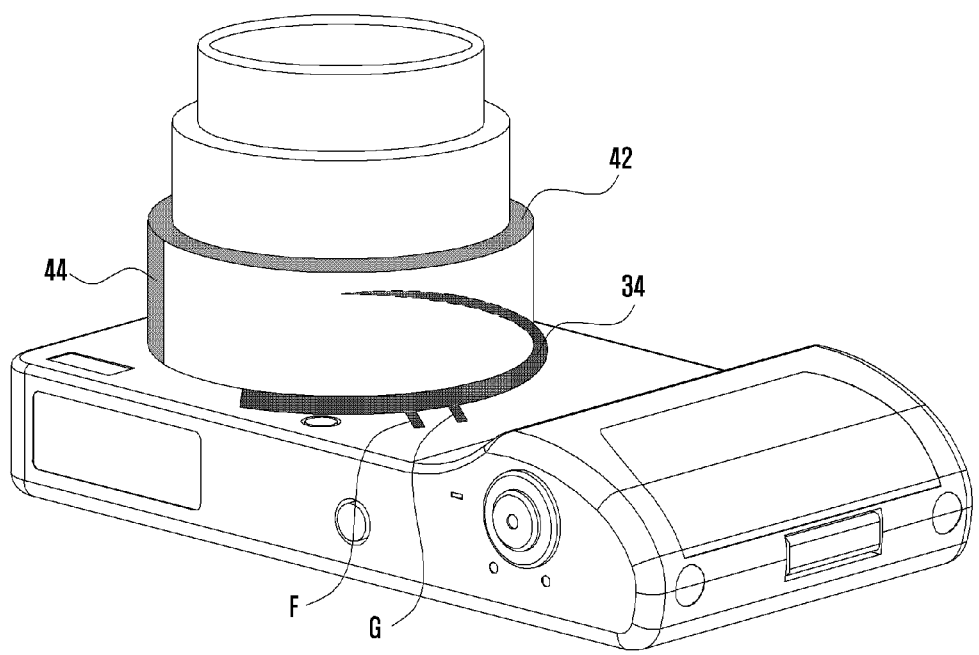

FIG. 3B illustrates an example in which the first radiator 34 and the second radiator 42 are in a non-contact state, in which the lens barrel 40 is rotated from its orientation in FIG. 3A in a predetermined direction to move the connector 44, and the second radiator 42 is spaced apart from the first radiator 34.

Referring to FIGS. 3A and 3B, the first radiator 34 and the second radiator 42 may implement different resonance frequencies according to the contact or non-contact state between the first radiator 34 and the second radiator 42. Further, the first radiator 34 may be implemented as a single antenna or a coupling antenna depending on the gap distance between the first radiator 34 and the second radiator 42.

That is, if the first radiator 34 is spaced apart from the second radiator 42 by a predetermined distance, it is not affected by the radio wave or metal interference of the second radiator 42, but may be implemented as a single antenna. The first radiator 34 may be implemented as a single antenna, and for example, through implementation of the resonance frequency characteristics of 2.4 GHz and 5 GHz, it may be implemented as a Wi-Fi antenna.

The gap distance between the first radiator 34 and the second radiator 42 may be adjusted by moving the second radiator 42 towards/away from the first radiator 34 through rotation of the lens barrel 40.

Hereinafter, an inductive coupling antenna between the first radiator 34 and the second radiator 42 will be described later with reference to FIGS. 3C and 3D.

As shown in FIG. 3A, the first radiator 34 comes in contact with the second radiator 42 by the connector 44 of the second radiator 42 and is electrically connected to the second radiator 42 to implement the second resonance frequency. That is, the first radiator 34 may be implemented as a single antenna or a coupling antenna in a state in which the first radiator 34 is spaced apart from the second radiator 42. If the first radiator 34 comes in contact with the second radiator 42 by the rotation of the lens barrel 40, a composite radiator having a length that is obtained by adding the length of the first radiator 34 to the length of the second radiator 42 may be provided. Since the length of the second radiator 42 is added to the length of the first radiator 34, a relatively low frequency band can be implemented.

For example, the radiator may be implemented as at least one of a Bluetooth (BT) antenna, a Global Positioning System (GPS) antenna, a Global System for Mobile communication (GSM) antenna, a Code Division Multiple Access (CDMA) antenna, and a Wideband CDMA (WCDMA) antenna, and a diversity antenna.

Figure 5:
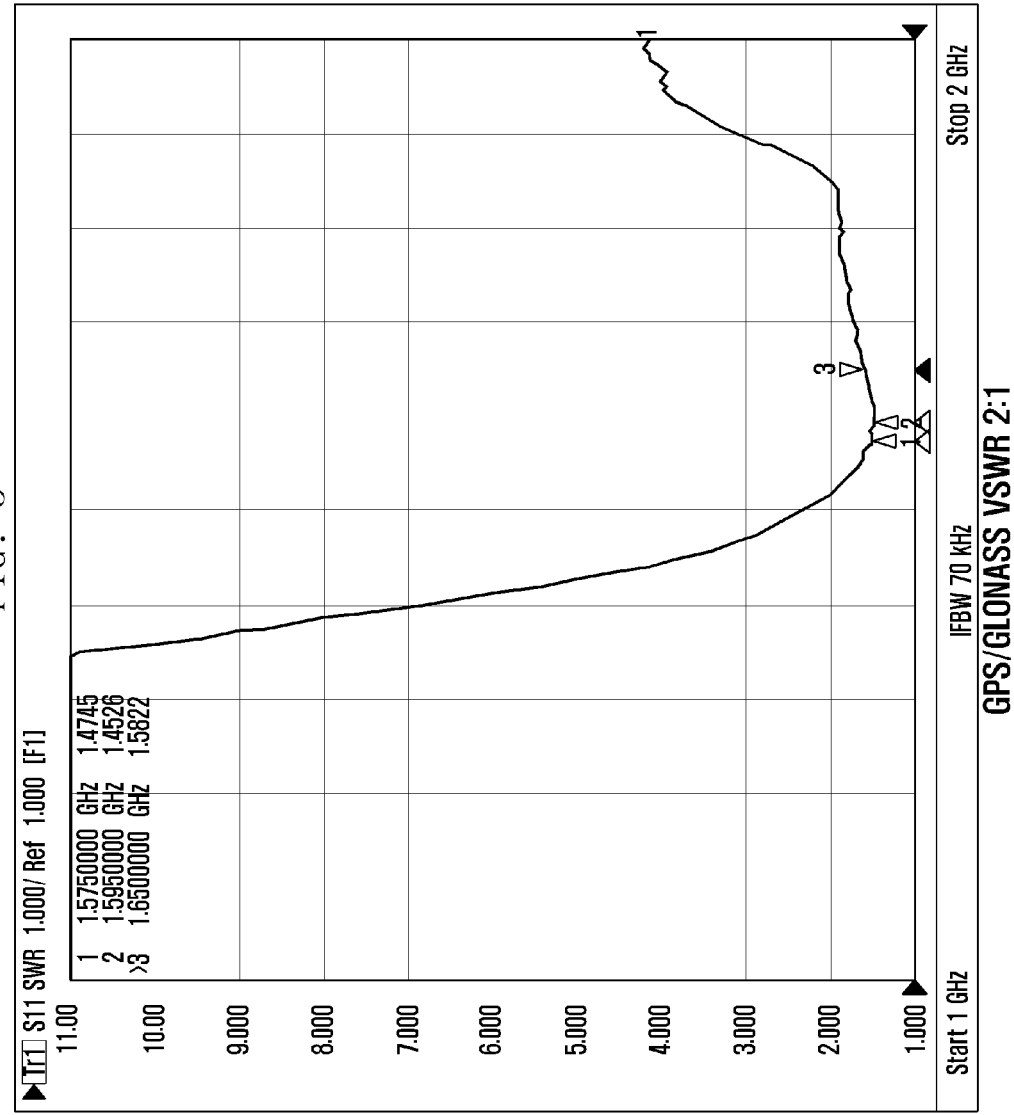
FIG. 5 is a graph illustrating simulation results of the VSWR characteristics of a first radiator and a second radiator according to an embodiment of the present invention.

FIG. 4 is a graph illustrating simulation results of the VSWR characteristics of a first radiator according to an embodiment of the present invention. FIG. 5 is a graph illustrating simulation results of the VSWR characteristics of a first radiator and a second radiator according to an embodiment of the present invention.

Referring to FIG. 4, it is shown that the resonance frequency of the first radiator 34 illustrated in FIG. 3B indicates the radiation pattern of a Wi-Fi band (2.4 GHz and 5 GHz) that is the high frequency band among the frequency bands of the antenna for a camera.

Referring to FIG. 5, it is shown that the resonance frequency of the first radiator 34 and the second radiator 42 illustrated in FIG. 3A indicates the radiation pattern of a GPS band (1.5 GHz) that is a relatively low frequency band among the frequency bands of the antenna for a camera.

As shown in the graphs of the simulation results of FIGS. 4 and 5, it is shown that the resonance frequency of the antenna can be easily adjusted using the first radiator 34 that operates as the first antenna and the second antenna that operates as one antenna when the first radiator 34 and the second radiator 42 are selectively connected to each other.

That is, if the first radiator 34 is spaced apart from the second radiator 42 by a predetermined distance, it functions as an antenna having the high-frequency band characteristics, whereas if the first radiator 34 is directly connected to the second radiator 42, it functions as an antenna having the low-frequency band characteristics.

Further, by adjusting the length of the second radiator 42, the resonance frequency can be adjusted.

Figure 3C:
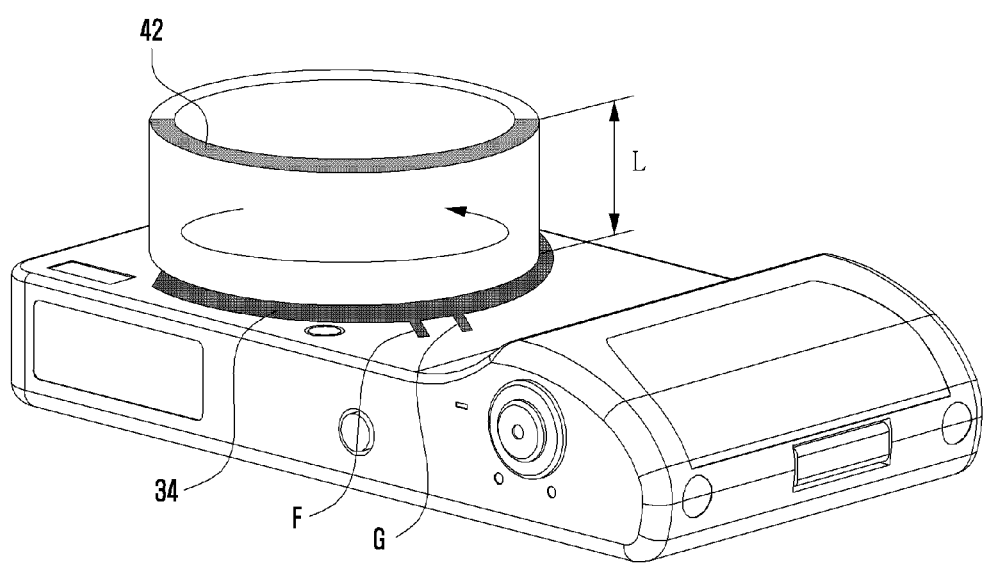
Figure 3D:
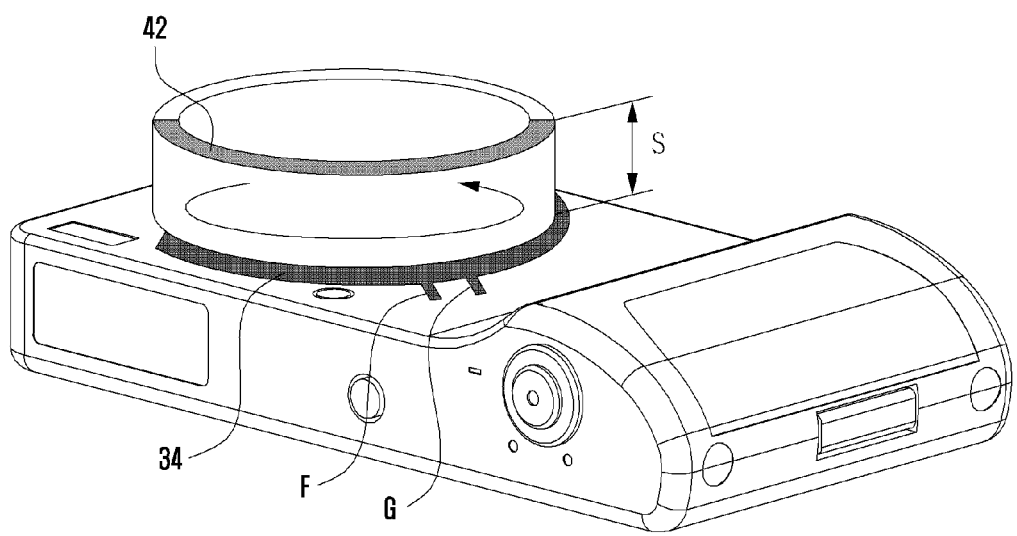

FIGS. 3C and 3D are views schematically illustrating the structure of a coupling antenna according to an embodiment of the present invention.

Referring to FIGS. 3C and 3D, the first radiator 34 and the second radiator 42 may be coupling antennas implemented by a coupling that is induced in a state in which the first radiator 34 and the second radiator 42 are in a non-contact state and are spaced apart from each other by a predetermined adjacent distance.

Here, the coupling may be defined as a phenomenon in which, as ends of a high frequency band and a low frequency band approach each other, bandwidth extension of the high and low frequency bands and the movement characteristic of the high frequency to a center frequency occur, and movement to a desired band becomes possible through appropriate tuning.

The first radiator 34 and the second radiator 42 may have an induced coupling value that is adjusted depending on the gap distance. The distance between the first radiator 34 and the second radiator 42 may be adjusted in accordance with the degree of extension of the lens barrel 40 through the zoom-in function.

Figure 6:
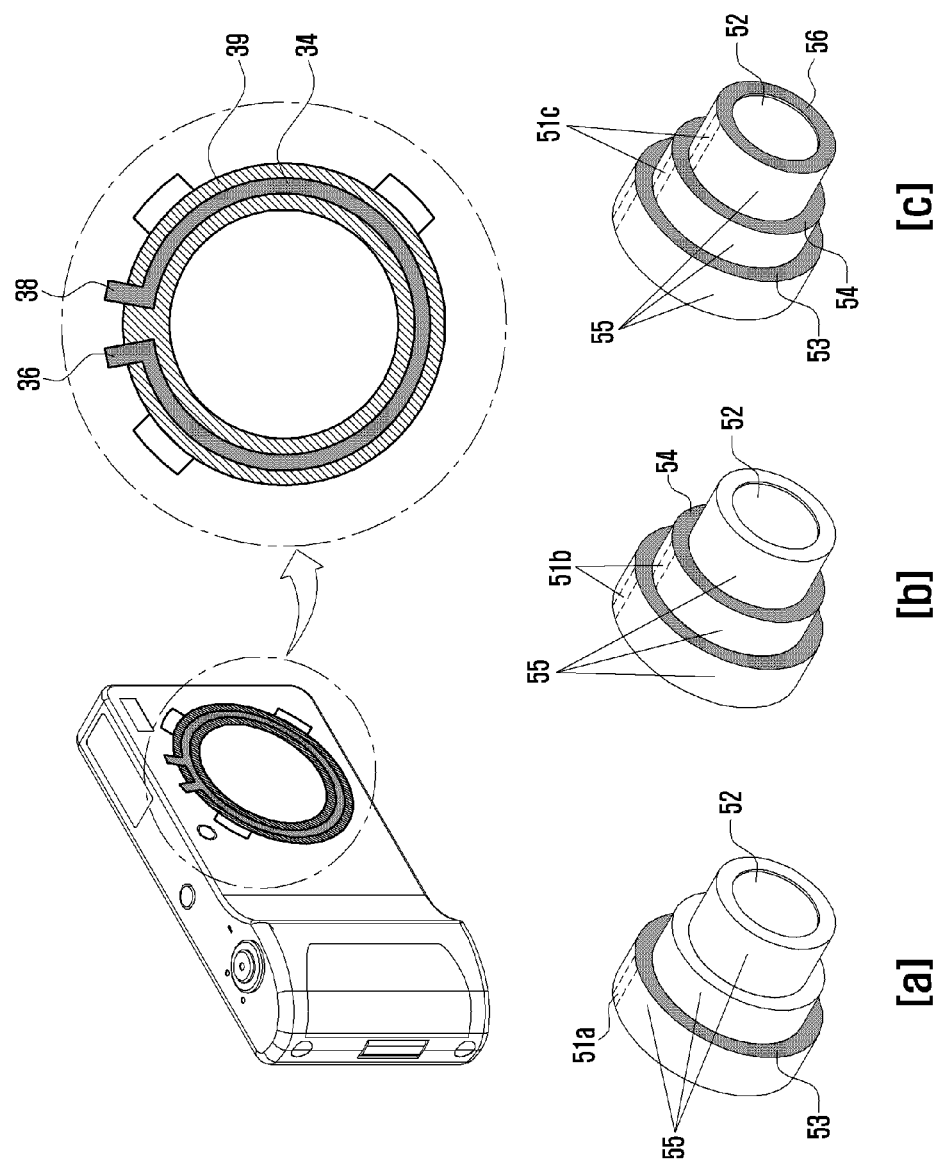
FIG. 6 is a view illustrating various structures of a second radiator of an antenna for a camera according to an embodiment of the present invention.

FIG. 6 is a view illustrating various structures of a second radiator of an antenna for a camera according to an embodiment of the present invention.

Referring to FIG. 6, the second radiator of the antenna may include different lengths in accordance with a plurality of lens barrels.

For example, the lens barrel 55 may be configured in an extendable form as illustrated in FIG. 6 and may include an object lens 52. Further, the barrel 55 may include a plurality of lenses (not illustrated in the drawing). A barrel portion having the widest radius of the barrel 55 may include a radiator that operates as a Wi-Fi antenna. This is illustrated in (a) of FIG. 6. If the barrel 55 is configured in three stages, the barrel portion having the secondly wide radius may include a radiator that operates as an RFID antenna 54. This is illustrated in (b) of FIG. 6. If the barrel 55 is configured in three stages, a barrel portion having the smallest radius to operate as a telephoto lens may include a radiator that operates as an NFC antenna. This is illustrated in (c) of FIG. 6. The respective antennas as described above are merely exemplary, and various types of antennas may be configured to receive different frequencies. That is, second radiators for different antennas may be achieved with different lengths for a plurality of lenses that are detachably attached to the camera.

It will be apparent to those skilled in the art that the second radiator as described above may be connected to the first radiator 34 to implement an integrated antenna and the second radiator, instead of the first radiator 34, may be embodied as one antenna. As described above, the first radiator may include a body portion 23 of the camera. However, the first radiator of the lens portion, for example, the radiator 53 exemplified in (a) of FIG. 6, may be the first radiator. Further, although it is exemplified that the radiator is positioned in parallel to the object lens 52, the radiator may be positioned on the circumference where the barrel is extended. Hereinafter, for convenience in explanation, it is assumed that the first radiator 34 is positioned on the body portion 23 of the camera.

On the other hand, the second radiator may include contact portions 51a that are provided between the respective stages of the lens barrel 40 to selectively connect the plurality of radiators, which are disposed at the respective stages of the lens barrel 40, and the adjacent radiators.

The contact portions 51a of the second radiator is configured to connect the plurality of radiators disposed at the respective stages of the lens barrel 40 while the lens barrel 40 is rotated to be extended. The contact portions 51 may be provided as radiators having the same material as the material of the plurality of radiators.

The respective contact portions 51a, 51b, and 51c (hereinafter, the reference numeral 51 is used as a generic term of the contact portion) may be mounted on surfaces of parts of the respective stages of the lens barrel 40. The contact portions 51 mounted on the different stages may come in contact with each other, thereby becoming electrically connected to each other, as the plurality of stages project outwardly.

The contact portions 51 as described above may selectively connect the plurality of radiators disposed at the respective stages of the lens barrel 40 to adjust the second resonance frequency as the lens barrel 40 is rotated in the predetermined direction.

In this case, the contact portions 51 mounted on the respective stages may be selectively connected to each other depending on the direction in which the lens barrel 40 is rotated according to a user input. That is, a user may cause the contact portions 51 mounted on the neighboring stages come in contact with each other or be spaced apart from each other through adjustment of the rotation of the lens barrel 40.

As described above, since the antennas are implemented on the lens barrel 40 and/or the lens insertion portion, a separate area for installing the antennas in the camera is not required, and thus, the inner space efficiency of the camera is improved.

The first radiator 34 and the second radiator 42 may be provided as at least one conductive metal pattern in a metal sheet, a tin lamination pattern, a FPCB pattern, and a film pattern.

Although not illustrated, in order to shield electromagnetic waves generated from other electronic components of the camera, electromagnetic wave shielding films, on which copper and nickel are plated, may be further provided on the body portion 23, between the lens barrel 40, and/or on the lower portion of the lens insertion portion. Further, the reference numerals 36 and 38 denote configuration to be connected to a portion for feeding the power to the antenna, and 39 denotes a shield for preventing foreign substances from flowing into the body of the camera. Further, the first radiator 34, which is composed of a conductor that forms the first antenna, is exemplified.

Figure 7:
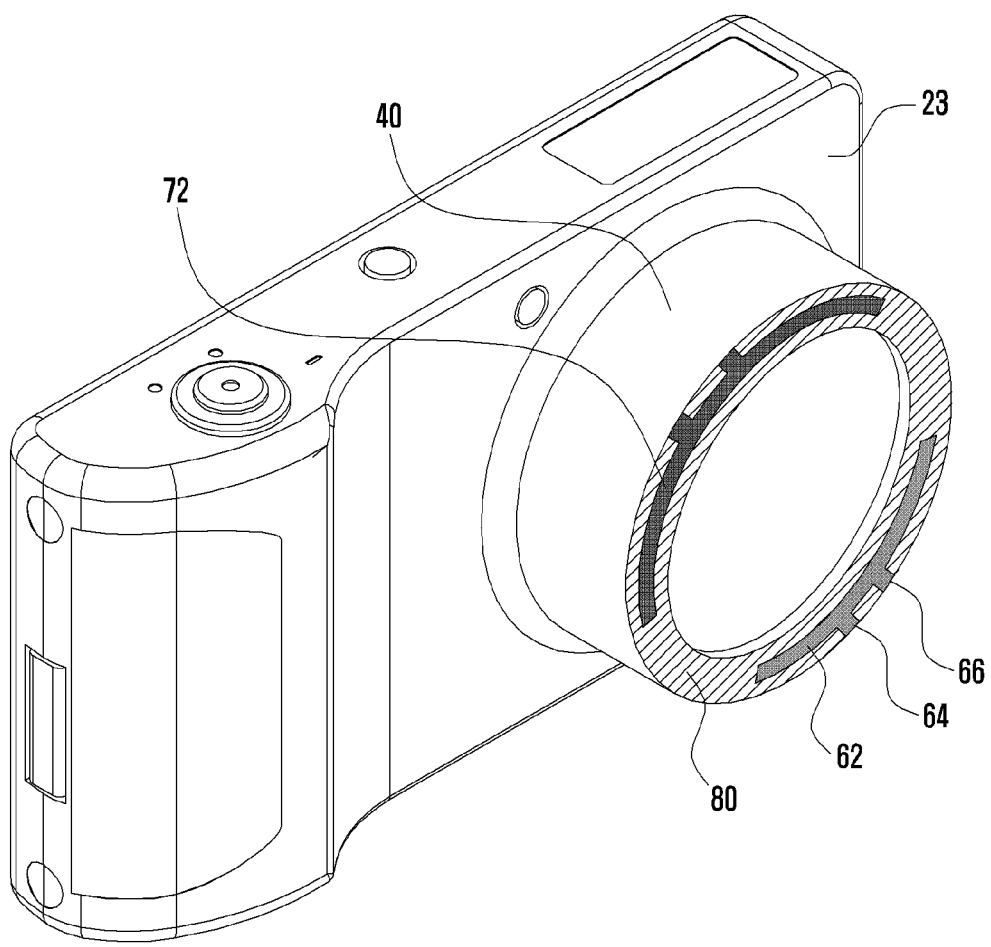
FIG. 7 is a view illustrating the structure of an antenna for a camera according to an embodiment of the present invention.
Figure 8:
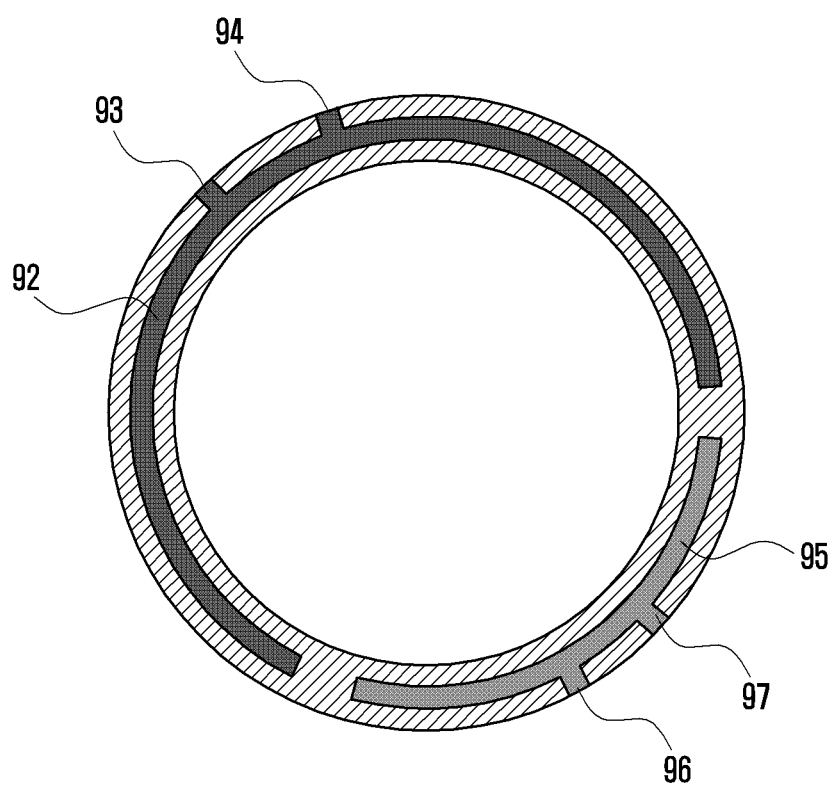
FIG. 8 is a view illustrating the structure in which an antenna for a camera according to an embodiment of the present invention is implemented on a filter.

FIG. 7 is a view illustrating the structure of an antenna for a camera according to an embodiment of the present invention, and FIG. 8 is a view illustrating the structure in which an antenna for a camera according to an embodiment of the present invention is implemented on a camera filter.

Referring to FIG. 7, the antenna may include one or more radiators 62 and 72 provided at distal end 80 of the lens barrel 40 (i.e., at a farthest projected region).

The respective radiators 62 and 72 may receive power from the main board (not shown) of the camera through connection wires (not shown) connected to the inside of the lens barrel, and may be connected to a metal body portion 23 of the camera to be grounded. Further, a coupling antenna, which is provided through coupling induced between the radiators 62 and 72, may be implemented. Further, the reference numerals 62 and 64 denote a power feeding line and a ground line of the respective antennas as described above.

Referring to FIG. 8, according to an embodiment of the present invention, the antenna may include a third radiator provided along the circumference of a lens filter frame 90 of the camera.

In the same manner, the third radiator may be provided so that two or more radiators 92 and 95 are spaced apart from each other by a predetermined distance, receive power from the main board of the camera through the wires (not shown) connected to the inside of the lens barrel, and may be connected to the metal body portion 23 of the camera to be grounded.

Further, the third radiator may be implemented as a coupling antenna through coupling, induced between the plurality of radiators 92 and 95.

The thickness and the length of the third radiator may be determined based on the resonance frequency of the antenna. Further, the third radiator may be provided as a plurality of radiators that are spaced apart from each other by a predetermined distance on the lens filter frame 90 of the camera. Further, the reference numerals 93, 94, 96, and 97 denote power feeding lines and ground lines of the respective antennas. The predetermined distance between the plurality of third radiators may be defined as a distance in which the radiation gain of the antenna can be achieved without causing radio wave influence between the plurality of radiators.

The third radiator may be connected to the power feeding portion F supplying the electric signal and the ground portion G grounding the first radiator.

The power feeding portion F may be connected to the main board inside the camera to feed the power to the third radiator. The ground portion G may be connected to the metal that surrounds the body portion 23 of the camera to ground the third radiator. In particular, according to an embodiment of the present invention, the antennas are grounded using the metal surrounding the camera body, and thus the broadband characteristic is achieved.

Figure 9:
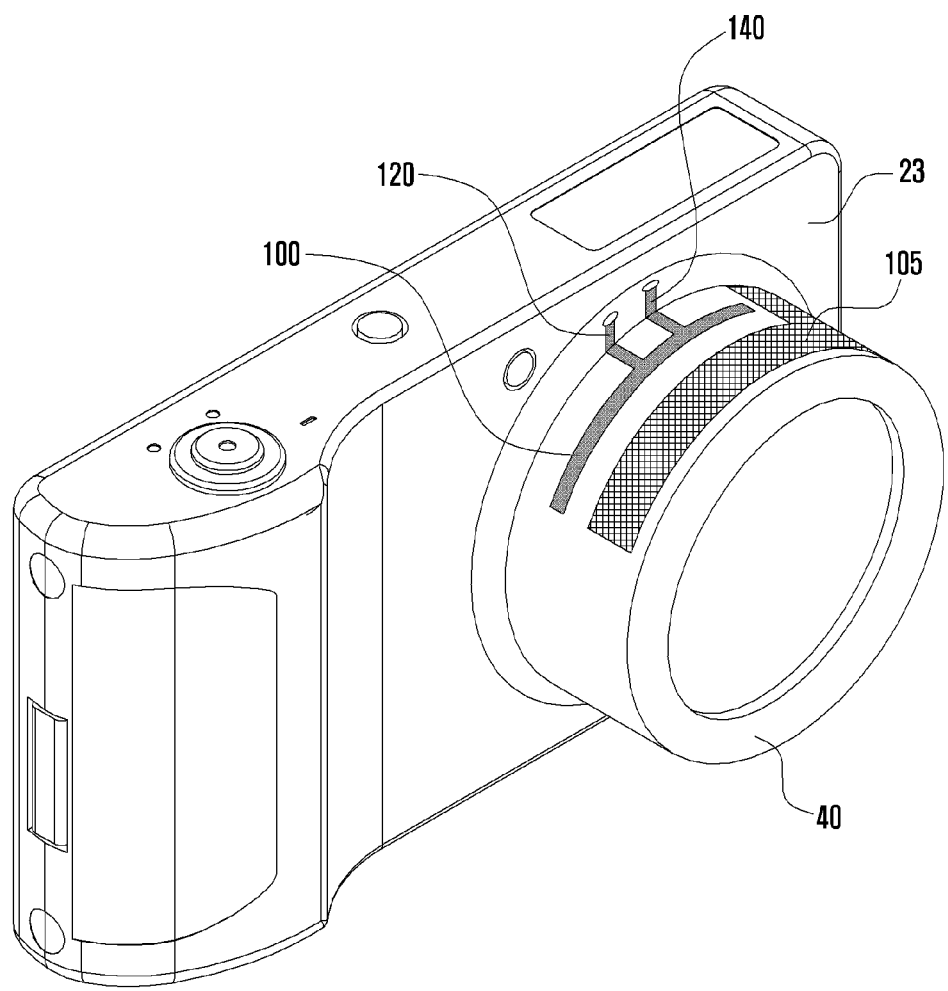
FIG. 9 is a view illustrating the structure of an antenna for a camera according to another an of the present invention.

FIG. 9 is a view illustrating the structure of an antenna for a camera according to another embodiment of the present invention.

Specifically, FIG. 9 illustrates an antenna for a camera that projects from one surface of the camera body 23, which is surrounded by the metal, and is provided on the camera that includes the lens barrel having an injection-molded outer surface that is surrounded by metal.

The antenna for a camera illustrated in FIG. 9 includes slit radiators 100 and 105 that are disposed along at least a part of the circumference of the injection-molded outer surface of the lens barrel 40 and is spaced apart from the metal of the camera body 23 by a predetermined distance.

The slit radiators 100 and 105 is barely affected by the radio waves because of the metal, and may be spaced apart from the metal by a predetermined distance large enough to achieve the radiation gain of the antenna. For example, by removing a part of the metal that surrounds the lens barrel 40 to mount the antenna, a radiation gain extension region of the antenna can be achieved. The slit radiators 100 and 105 may be disposed in the radiation gain extension region.

The slit radiators 100 and 105 may be connected to the main board of the camera by the power feeding portion 120 that feeds power to the slit radiator 100. Further, the slit radiator 100 may be connected to the ground portion 140 that grounds the slit radiator 100 through the body portion 23 of the camera.

Figure 10:
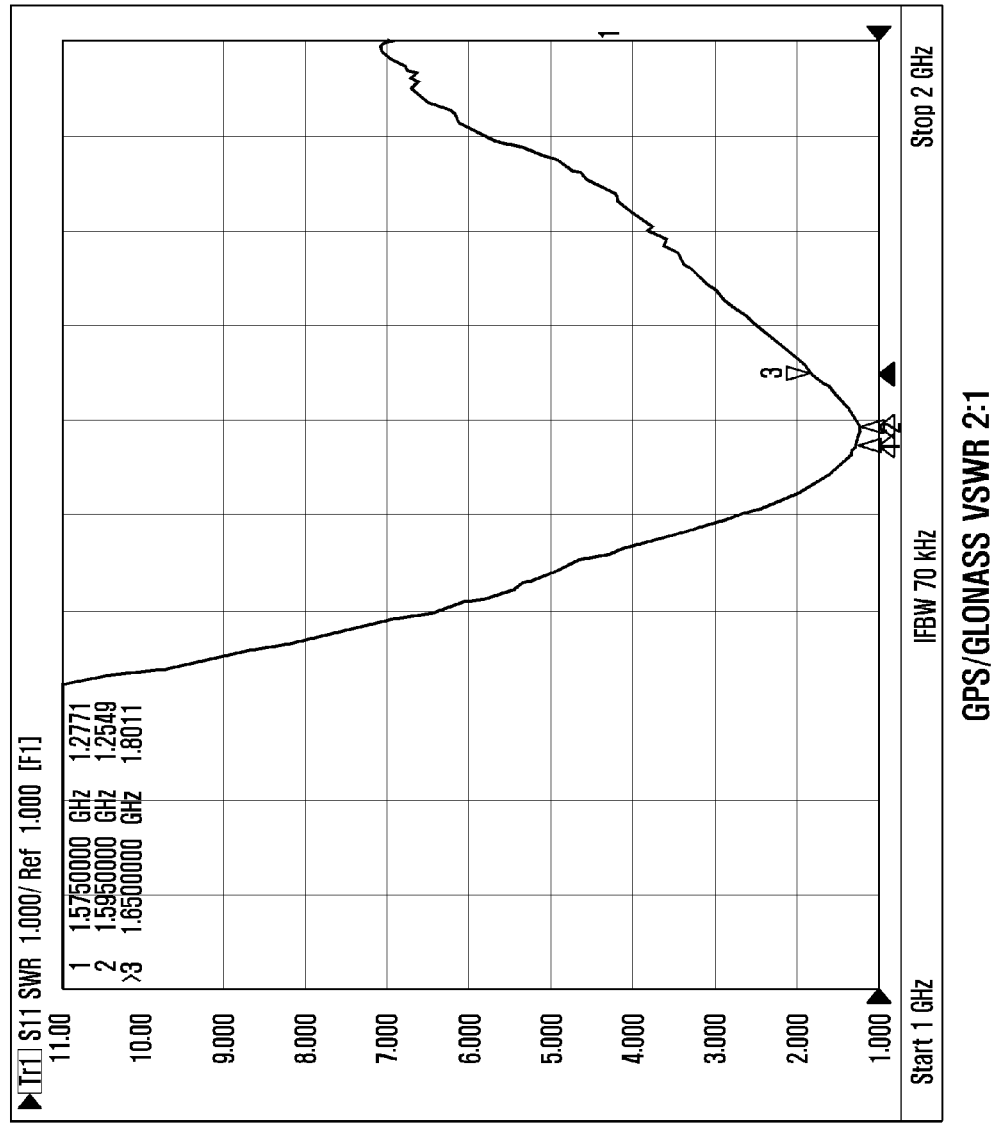
FIG. 10 is a graph illustrating simulation results of the VSWR characteristics of a slit radiator according to an embodiment of the present invention.

One or more slit radiators 100 and 105 may be disposed along at least a part of the circumference of a part of the injection-molded outer surface of the lens barrel 40 on the basis of the form exemplified in FIG. 10, and may be spaced apart from each other by a predetermined distance if a plurality of slit radiators are provided as an example that is different from the form illustrated in FIG. 10. The slit radiators 100 may be implemented with different lengths and widths, and thus may be implemented as antennas having different resonance frequencies.

FIG. 10 is a graph illustrating simulation results of the VSWR characteristics of a slit radiator according to an embodiment of the present invention.

Referring to FIG. 10, it is shown that the slit radiator 100 and 105 illustrated in FIG. 9 has a radiation pattern having the resonance frequency band of 1.5 GHz.

Although it is illustrated that the resonance frequency of the slit radiators 100 and 105 are the radiation pattern of the GPS band, the resonance frequency can be adjusted through the adjustment of the implemented length or width and the inductive coupling with an adjacent radiator.

Figure 11:
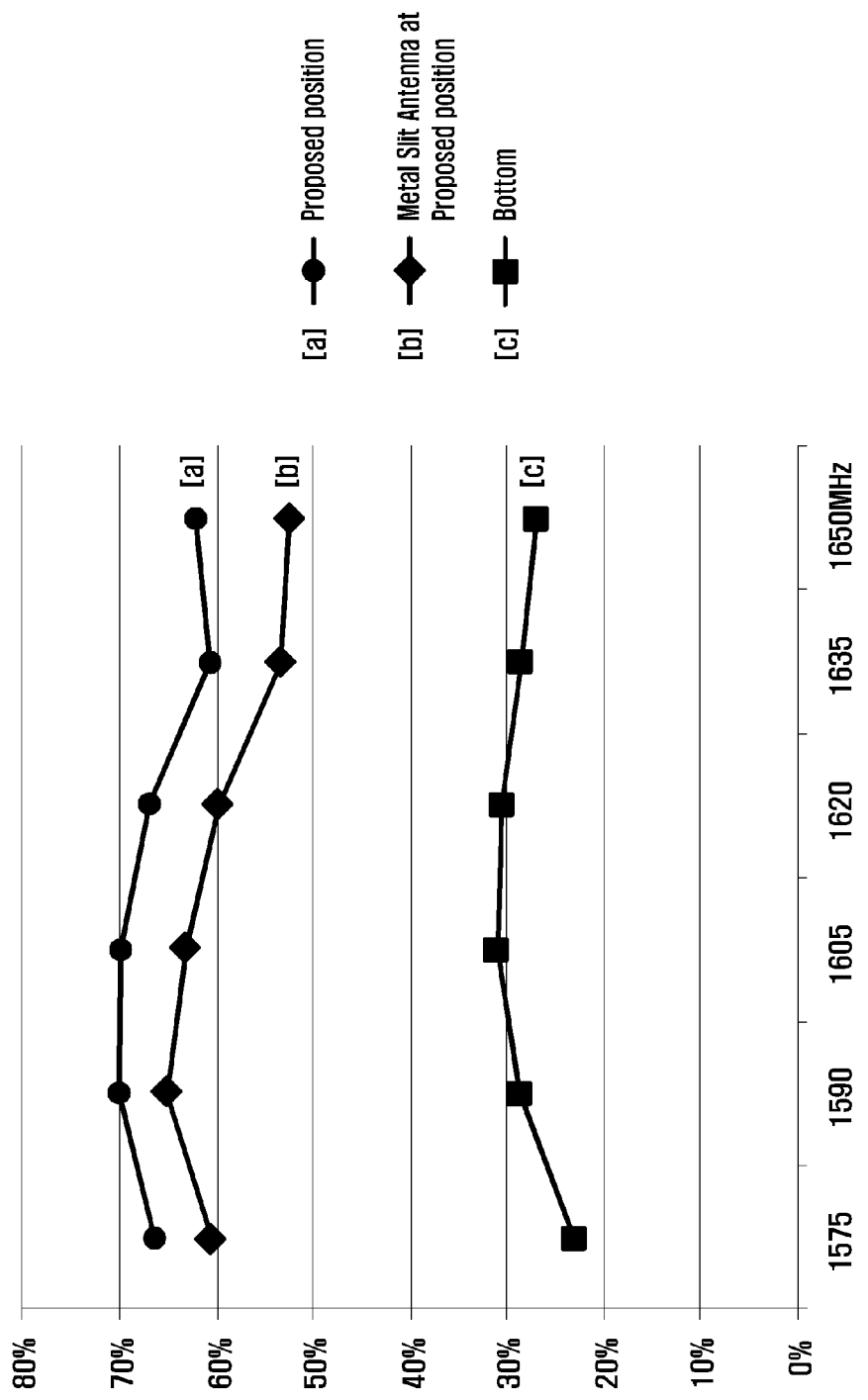
FIG. 11 is a graph illustrating the antenna radiation gain efficiencies of an antenna radiator according to an embodiment of the present invention versus an antenna radiator according to the related art.

FIG. 11 is a graph illustrating the antenna radiation gain efficiencies of an antenna radiator according to an embodiment of the present invention versus an antenna radiator in the related art.

Referring to FIG. 11, it can be known that the radiators (a) and the slit radiator (b), provided along the extension direction of the lens insertion portion, and the lens barrel according to an embodiment of the present invention have a radiation gain efficiency that is quite higher than the radiation gain efficiency of the antennas (c) mounted on the bottom surface of the camera as in the related art.

Accordingly, the antenna according to an embodiment of the present invention can prevent the deterioration of the radiation gain efficiency caused by interference with other metal portions, and is implemented at a position where the antenna radio wave radiation is optimal to improve the radiation gain efficiency.

Figure 12:
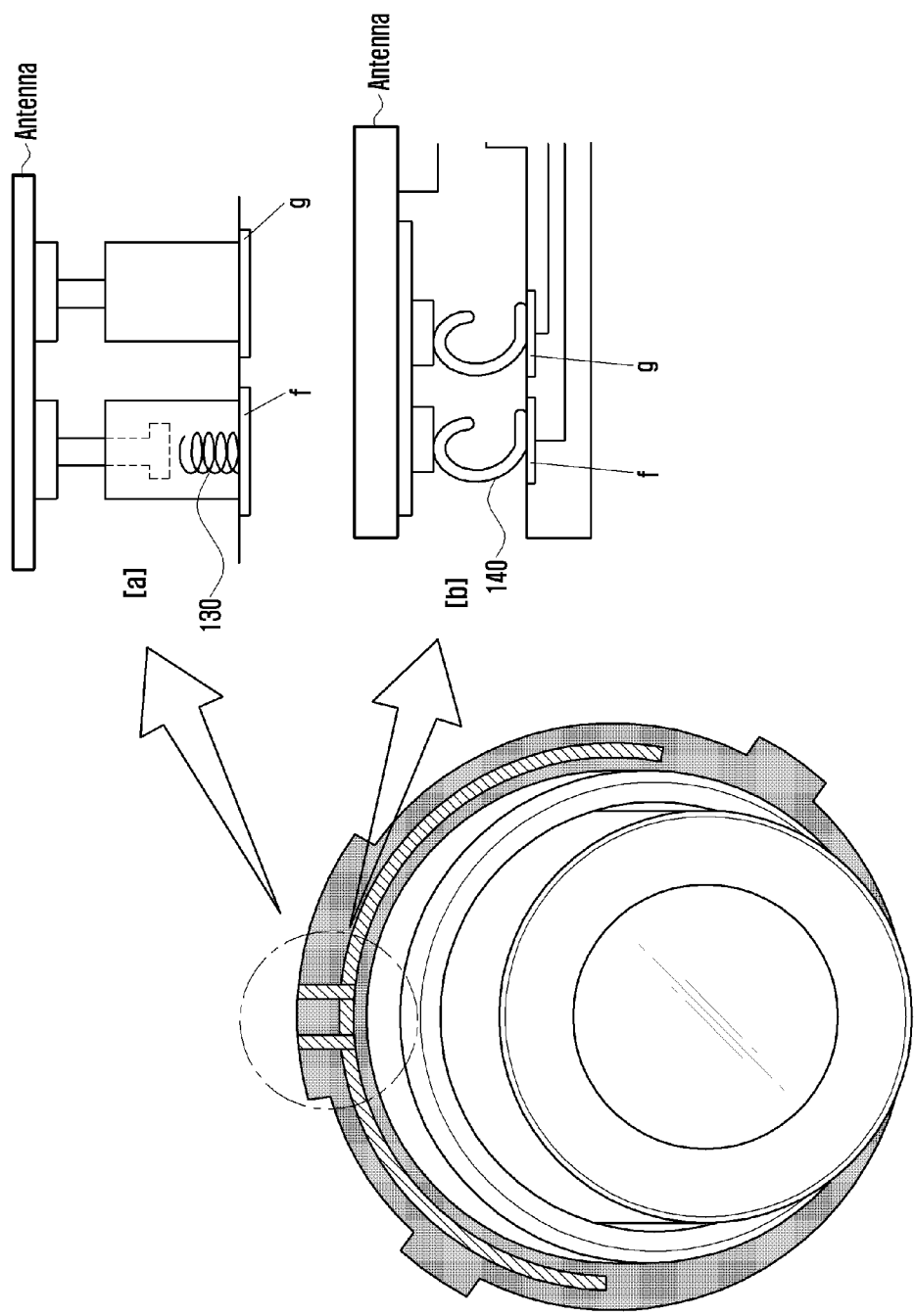
FIG. 12 is a view illustrating the fastening structure of an antenna for a camera according to an embodiment of the present invention.

FIG. 12 is a view illustrating the fastening structure of an antenna for a camera, according to an embodiment of the present invention.

Referring to FIG. 12, the power feeding portion F and the ground portion G of the antenna may be formed on the camera using at least one of a spring 130, a C clip 140, and a soldering (not illustrated in the drawing).

Figure 13:
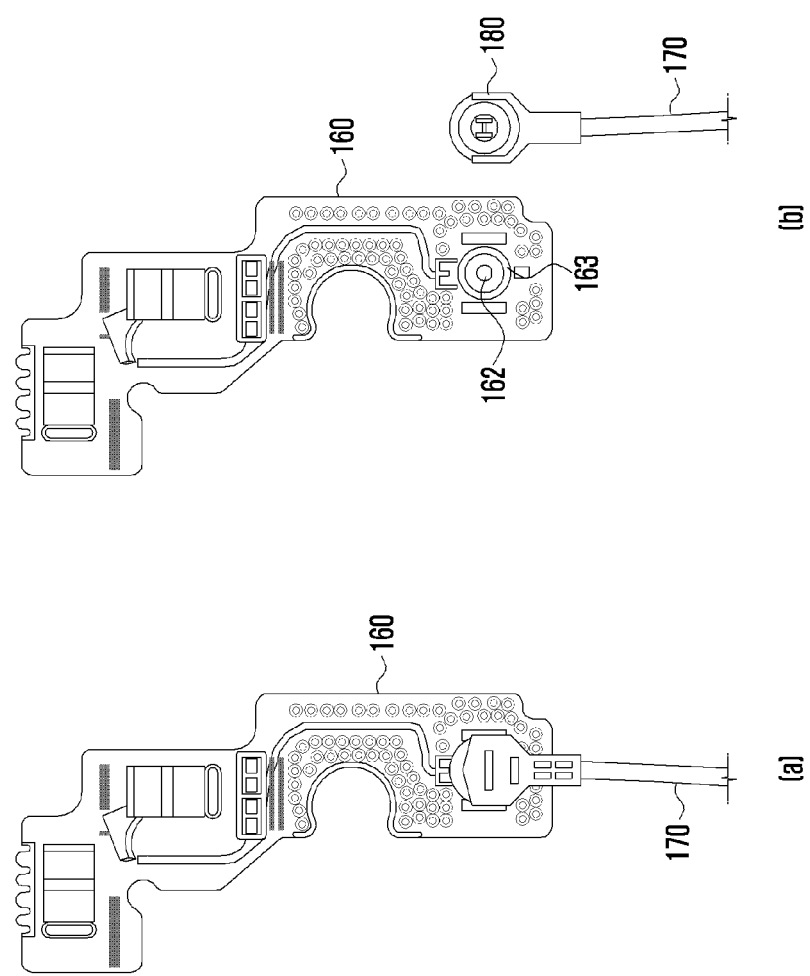
FIG. 13 is a view explaining a connection between a power feeding portion and a ground portion of an antenna for a camera and a circuit according to an embodiment of the disclosure.

FIG. 13 is a view explaining a connection between a power feeding portion F and a ground portion G of an antenna for a camera and a circuit according to an embodiment of the disclosure.

Accordingly, FIG. 13 is a view explaining the connection between the power feeding portion F and the ground portion G and the circuit board after the power feeding portion F and the ground portion G, which are provided at one end of the radiator of the antenna through the configuration of FIG. 12, are connected to each other.

As exemplified in FIG. 13, a projection type power feeding portion 162 is provided on the circuit board 160 for power feeding to the antenna, and a cable 170 that is connected to one end of the antenna may be configured in the form of a socket 180 into which the projection type power feeding portion 162 can be inserted.

As exemplified in (a) of FIG. 13, the cable 170 having the socket 180 may be fastened to the circuit board 160, and as exemplified in (b) of FIG. 13, the cable 170 having the socket 180 may be separated from the circuit board 160.

Further, the projection type power feeding portion 162 may also have a ground line. The ground line may be a portion having a cylindrical pole shape 163 that surrounds the projection type outline. Accordingly, two different conductive lines are provided inside the cable 170. One conductive line may be a conductive line for power feeding, and the other conductive line may be a conductive line for grounding. Further, the respective conductive lines included in the cable 170 may be surrounded by an insulator. Further, two conductive lines surrounded by the insulator may be included in one cable 170.

As described above, according to the antenna of the present invention, the radiators having different structures are provided for the plurality of lens barrels that are detachably attached to the camera, and thus the antennas having different frequency bands can be selectively utilized by the camera.

Further, by adjusting the length of the radiators provided in the extension direction of the lens barrel using the zoom-in function of the lens barrel, the resonance frequency of the antenna can be easily changed.

Further, by grounding the antenna to the metal surrounding the camera body, the broadband characteristics of the antenna can be implemented.

Still further, by implementing the antennas in the form of a slit that is spaced apart from the metal body by a predetermined distance, the deterioration of the radiation gain efficiency of the antenna caused by the interference with other metal parts can be prevented.

It will be understood by those of ordinary skill in the art to which the present invention pertains that various changes in form and detail may be made therein without changing the technical idea or essential features of the present invention. Accordingly, it will be understood that the above-described embodiments do not limit the scope of the present invention.

Accordingly, the scope of the present invention is defined by the appended claims, and it will be understood that all variations and modifications derived from the meanings and scope of the following claims and equivalent concepts fall within the scope of the present invention.

What is claimed is:

1. An antenna for a camera having a communication module, the antenna comprising:
   a first radiator provided on a front surface portion of a distal end of a lens barrel of the camera and having a length and a width for receiving a signal from a first wireless communication system;
   a second radiator arranged in the lens barrel to be spaced apart for a predetermined distance from the first radiator to provide a coupling signal to the first radiator;
   a power feeding line configured to feed a power from the communication module of the camera to the first radiator;
   a connector configured to selectively connect the first radiator to the second radiator; and
   a ground line configured to ground the first radiator.

2. The antenna for the camera of claim 1, further comprising:
   when the lens barrel has multiple sections, a second radiator provided on a front surface portion of a distal end of a second section of the lens barrel; and
   the connector is connected to one end of the second radiator and one end of the first radiator,
   wherein when the first radiator and the second radiator are connected to each other, a signal is received from a second wireless communication system corresponding to a connection length of the first radiator and the second radiator and widths of the respective radiators.

3. The antenna for the camera of claim 2, wherein the first radiator is implemented as a Wi-Fi antenna, and when the second radiator is connected to the first radiator, a length and a width of the second radiator are set so that the second radiator operates as one of a Bluetooth (BT) antenna, a Global Positioning System (GPS) antenna, a Global System for Mobile communication (GSM) antenna, a Code Division Multiple Access (CDMA) antenna, a Wideband Code Division Multiple Access (WCDMA) antenna, and a diversity antenna.

4. The antenna for the camera of claim 1, wherein the connector is selectively connected to the first radiator or the second radiator according to a rotation of the lens barrel.

5. The antenna for the camera of claim 1, wherein the first radiator is arranged orthogonally to an object lens on a circumference of the lens barrel.

6. The antenna for the camera of claim 1, wherein if the lens barrel is configured in multiple sections, the first radiator and the second radiator are arranged at different ends.

7. The antenna for the camera of claim 6, wherein when the first radiator is arranged on a front surface portion of the distal end of the lens barrel in parallel to an object lens of the lens barrel, the second radiator is arranged on the front surface portion of the corresponding end in parallel to the object lens at the corresponding end of the lens barrel.

8. The antenna for the camera of claim 6, wherein when the first radiator is arranged orthogonally to an object lens on a circumference of the lens barrel, the second radiator is arranged orthogonally to the object lens on the circumference of the lens barrel of the corresponding end.

9. The antenna for the camera of claim 1, wherein the first radiator and the second radiator are arranged on the same end of the lens barrel.

10. The antenna for the camera of claim 1, further comprising:
    the second radiator is arranged in a position to which the lens barrel is coupled if the lens barrel can be spaced apart from the camera; and
    the connector is connected to one end of the first radiator and one end of the second radiator,
    wherein when the first radiator and the second radiator are connected to each other, a signal is received from a second wireless communication system corresponding to a connection length of the first radiator and the second radiator and widths of the respective radiators.

11. The antenna for the camera of claim 10, wherein the first radiator is implemented as a Wi-Fi antenna, and when the second radiator is connected to the first radiator, a length and a width of the second radiator are set so that the second radiator operates as one of a Bluetooth (BT) antenna, a Global Positioning System (GPS) antenna, a Global System for Mobile communication (GSM) antenna, a Code Division Multiple Access (CDMA) antenna, a Wideband Code Division Multiple Access (WCDMA) antenna, and a diversity antenna.

12. The antenna for the camera of claim 10, wherein the connector is selectively connected to the first radiator or the second radiator according to rotation of the lens barrel.

13. The antenna for the camera of claim 12, wherein the first radiator is arranged on the front surface portion of the distal end of the lens barrel, in parallel to an object lens of the lens barrel.

14. The antenna for the camera of claim 12, wherein the first radiator is arranged orthogonally to an object lens on a circumference of the lens barrel.

15. The antenna for the camera of claim 10, wherein the second radiator is spaced apart for a predetermined distance from the first radiator to operate as a slit-type antenna if the lens barrel of the camera is a conductor.

16. The antenna for the camera of claim 15, further comprising the slit type second antenna capable of receiving a different frequency at at least one end of the lens barrel that is different from an end of the lens barrel where the antenna composed of the first radiator and the second radiator are positioned, when the lens barrel is configured in multiple sections.

17. The antenna for the camera of claim 16, wherein the first radiator is implemented as a Wi-Fi antenna, and the second radiator is configured as any one of a Bluetooth (BT) antenna, a Global Positioning System (GPS) antenna, a Global System for Mobile communication (GSM) antenna, a Code Division Multiple Access (CDMA) antenna, a Wideband Code Division Multiple Access (WCDMA) antenna, and a diversity antenna.

18. The antenna for the camera of claim 2, wherein
    the lens barrel has at least three sections,
    radiators are arranged at distal ends of the at least three sections of the lens barrel, connectors are connected to the radiators arranged at the distal ends of the at least three sections of the lens barrel, and
    signals are received from different wireless communication systems corresponding to connection lengths of the respective radiators and widths of the respective radiators.

19. The antenna for the camera of claim 1, wherein when the first radiator is connected to the second radiator, the antenna functions with low-frequency band characteristics, and when the first radiator is not connected to the second radiator, the antenna functions with high-frequency band characteristics.

* * * * *